United States Patent
Xiang et al.

(10) Patent No.: US 10,801,661 B2
(45) Date of Patent: Oct. 13, 2020

(54) CURVED-SURFACE TELEVISION WALL RACK

(71) Applicant: Loctek Ergonomic Technology Corp., Ningbo (CN)

(72) Inventors: Lehong Xiang, Ningbo (CN); Tao Lin, Ningbo (CN); Linghui Jiang, Ningbo (CN)

(73) Assignee: Loctek Ergonomic Technology Corp., Ningbo (CN)

( * ) Notice: Subject to any disclaimer, the term of this patent is extended or adjusted under 35 U.S.C. 154(b) by 34 days.

(21) Appl. No.: 15/307,353

(22) PCT Filed: Jan. 28, 2015

(86) PCT No.: PCT/CN2015/071740
§ 371 (c)(1),
(2) Date: Oct. 27, 2016

(87) PCT Pub. No.: WO2015/165292
PCT Pub. Date: Nov. 5, 2015

(65) Prior Publication Data
US 2017/0051870 A1   Feb. 23, 2017

(30) Foreign Application Priority Data
Apr. 28, 2014 (CN) .......................... 2014 1 0172817

(51) Int. Cl.
*F16M 13/02* (2006.01)
*F16M 11/04* (2006.01)
(Continued)

(52) U.S. Cl.
CPC .......... *F16M 13/02* (2013.01); *F16M 11/041* (2013.01); *F16M 11/08* (2013.01);
(Continued)

(58) Field of Classification Search
CPC ...... F16M 11/04; F16M 11/041; F16M 11/10; F16M 13/00; F16M 13/02; F16M 11/2014; A47B 96/067; H04N 5/64; H04N 5/655
(Continued)

(56) References Cited

U.S. PATENT DOCUMENTS 4,869,378 A * 9/1989 Miller ................... A47F 5/0853
211/94.01
5,321,579 A * 6/1994 Brown ................. A47B 83/001
174/496
(Continued)

FOREIGN PATENT DOCUMENTS

CN    201297483 Y    8/2009
CN    102466114 A    5/2012
(Continued)

*Primary Examiner* — Hiwot E Tefera
*Assistant Examiner* — Taylor L Morris
(74) *Attorney, Agent, or Firm* — Mahamedi IP Law LLP

(57) ABSTRACT

Disclosed is a curved-surface television wall mount, including a wall panel (1) mounted on a wall surface, and two television mounting plates (2) disposed on the wall panel (1) for mounting a television. The curved-surface television wall mount further includes two supports (3) disposed on the wall panel (1), and the backs of the two television mounting plates (2) are respectively connected by hinges to the two supports (3). When a curved-surface television is mounted by using this structure, the front sides of the television mounting plates can fit to the back of the curved-surface television, thus avoiding deviation, instability or looseness when tightening a fastener, and successfully mounting the curved-surface television.

14 Claims, 2 Drawing Sheets

(51) Int. Cl.

| | |
|---|---|
| *F16M 11/08* | (2006.01) |
| *H04N 5/64* | (2006.01) |
| *A47B 96/06* | (2006.01) |
| *F16M 11/10* | (2006.01) |
| *H04N 5/655* | (2006.01) |
| *A47B 81/06* | (2006.01) |
| *F16M 11/20* | (2006.01) |

(52) U.S. Cl.
CPC ................ *H04N 5/64* (2013.01); *A47B 81/06* (2013.01); *A47B 96/067* (2013.01); *F16M 11/10* (2013.01); *F16M 11/2014* (2013.01); *H04N 5/655* (2013.01)

(58) Field of Classification Search
USPC ... 248/220.21, 223.13, 222.14, 274.1, 276.1, 248/284.1, 294.1, 201, 282.1, 917, 919
See application file for complete search history.

(56) References Cited

U.S. PATENT DOCUMENTS

| | | | | |
|---|---|---|---|---|
| 5,687,856 | A * | 11/1997 | Kendrena | A47F 5/0846 211/65 |
| 6,102,348 | A * | 8/2000 | O'Neill | A47B 81/061 248/289.11 |
| 6,152,410 | A * | 11/2000 | Mark | A47B 81/06 248/220.1 |
| 7,070,156 | B2 * | 7/2006 | Liao | B60R 11/0235 248/225.21 |
| 7,316,379 | B1 * | 1/2008 | Graham | F16M 13/02 248/298.1 |
| 7,320,452 | B2 * | 1/2008 | Chen | A47F 5/0846 248/227.1 |
| 7,334,766 | B2 * | 2/2008 | Ligertwood | F16M 11/10 248/201 |
| 7,395,996 | B2 * | 7/2008 | Dittmer | F16M 11/10 248/291.1 |
| 7,448,584 | B2 * | 11/2008 | Chen | F16M 11/10 248/122.1 |
| 7,648,112 | B2 * | 1/2010 | Wu | F16M 11/045 248/282.1 |
| 7,722,002 | B2 * | 5/2010 | O'Keene | F16M 13/02 248/220.21 |
| 7,731,143 | B2 * | 6/2010 | Muday | F16M 11/10 248/276.1 |
| 7,878,473 | B1 * | 2/2011 | Oh | A47G 1/24 248/205.1 |
| 8,087,192 | B2 * | 1/2012 | Allen | F16M 11/10 248/284.1 |
| 8,136,775 | B2 * | 3/2012 | Chiang | A47B 97/00 211/87.01 |
| 8,235,341 | B2 * | 8/2012 | Taylor | F16M 11/10 248/201 |
| 8,245,990 | B2 * | 8/2012 | Huang | F16M 11/10 248/276.1 |
| 8,262,044 | B2 * | 9/2012 | Luijben | F16M 11/10 248/276.1 |
| 8,282,052 | B2 * | 10/2012 | Huang | F16M 11/045 248/125.1 |
| 8,322,673 | B2 * | 12/2012 | Sculler | F16M 13/02 248/317 |
| 8,369,103 | B2 * | 2/2013 | Mitsuhashi | F16M 13/02 248/917 |
| 8,622,005 | B1 * | 1/2014 | Whalen | F16M 11/00 108/42 |
| 8,628,051 | B2 * | 1/2014 | Huang | F16M 13/02 248/286.1 |
| 8,827,226 | B2 * | 9/2014 | Townsend | F16M 11/10 220/3.5 |
| 8,939,414 | B2 * | 1/2015 | Manno | F16M 11/10 248/215 |
| 10,145,503 | B2 * | 12/2018 | Feldman | F16M 11/00 |
| 2005/0087661 | A1 * | 4/2005 | Rabenius | F16M 11/043 248/309.1 |
| 2006/0243872 | A1 * | 11/2006 | Benzi | F16M 11/10 248/282.1 |
| 2007/0023375 | A1 * | 2/2007 | Fedewa | A47B 81/061 211/103 |
| 2007/0205340 | A1 * | 9/2007 | Jung | F16M 11/105 248/125.9 |
| 2007/0246629 | A1 * | 10/2007 | Saxton | F16M 11/08 248/309.1 |
| 2007/0252060 | A1 * | 11/2007 | McPherson | F16M 11/08 248/282.1 |
| 2008/0078906 | A1 * | 4/2008 | Hung | F16M 11/10 248/276.1 |
| 2008/0237426 | A1 * | 10/2008 | Walters | F16M 11/10 248/316.8 |
| 2009/0050763 | A1 * | 2/2009 | Dittmer | F16M 11/24 248/284.1 |
| 2009/0057515 | A1 * | 3/2009 | Chuang | F16M 13/02 248/305 |
| 2009/0101777 | A1 * | 4/2009 | Kim | F16M 11/126 248/220.21 |
| 2009/0173855 | A1 * | 7/2009 | Worrall | F16M 11/10 248/222.12 |
| 2009/0179128 | A1 * | 7/2009 | Boberg | F16M 11/10 248/278.1 |
| 2009/0206214 | A1 * | 8/2009 | David | A47B 96/067 248/205.1 |
| 2010/0001153 | A1 * | 1/2010 | Stenhouse | F16M 11/10 248/222.13 |
| 2010/0123061 | A1 * | 5/2010 | Vlies | F16M 11/10 248/220.1 |
| 2010/0172072 | A1 * | 7/2010 | Monaco | F16M 11/10 361/679.01 |
| 2010/0309615 | A1 * | 12/2010 | Grey | F16M 11/10 361/679.01 |
| 2011/0234926 | A1 * | 9/2011 | Smith | F16M 11/10 348/836 |
| 2011/0290971 | A1 * | 12/2011 | Molter | F16M 11/105 248/276.1 |
| 2012/0032062 | A1 | 2/2012 | Newville | |
| 2012/0104205 | A1 * | 5/2012 | Sculler | H05K 5/0017 248/291.1 |
| 2012/0255919 | A1 * | 10/2012 | Jones | F16M 11/10 211/26 |
| 2012/0305740 | A1 * | 12/2012 | Chen | F16M 11/048 248/560 |
| 2013/0082156 | A1 * | 4/2013 | Conner | F16M 11/2021 248/281.11 |
| 2014/0021312 | A1 * | 1/2014 | Nguyen | F16M 11/10 248/205.1 |
| 2014/0198465 | A1 * | 7/2014 | Park | G09F 9/301 361/749 |
| 2014/0270910 | A1 * | 9/2014 | Sculler | H04N 5/64 403/109.1 |
| 2015/0192952 | A1 * | 7/2015 | Jung | G06F 1/1652 361/747 |
| 2015/0296641 | A1 * | 10/2015 | Song | G06F 1/1601 361/679.01 |
| 2016/0040764 | A1 * | 2/2016 | Park | F16H 1/16 361/679.01 |
| 2016/0296018 | A1 * | 10/2016 | Ahn | F16M 11/041 |
| 2017/0289491 | A1 * | 10/2017 | Park | G09F 9/301 |

FOREIGN PATENT DOCUMENTS

| | | |
|---|---|---|
| CN | 102777742 A | 11/2012 |
| CN | 103883855 A | 6/2014 |
| CN | 103939717 A | 7/2014 |
| CN | 203948899 U | 11/2014 |
| CN | 204213577 U | 3/2015 |

* cited by examiner

CURVED-SURFACE TELEVISION WALL RACK

BACKGROUND

Technical Field

The present disclosure relates to a television wall mount, and specifically, to a curved-surface television wall mount.

Related Art

Existing television wall mounts are generally used for hanging flat panel televisions. However, as people increasingly demand higher viewing quality, the development of curved-surface televisions with curved display surfaces has also risen. A curved-surface television in general has an arc shape horizontally, and therefore, cannot be directly mounted by a flat panel television wall mount in the prior art. If an existing flat panel television wall mount is used, a television mounting plate cannot fit to the rear surface of the curved-surface television well, and leads to an unfavorable mounting effect and ease of looseness.

SUMMARY

A technical problem the present disclosure attempts to resolve is to overcome the disadvantages in the prior art to provide a curved-surface television wall mount capable of mounting a curved-surface television.

To resolve the aforementioned technical problem, the present invention provides a curved-surface television wall mount, comprising a wall panel for mounting on a wall surface, and two television mounting plates disposed on the wall panel for mounting a television, where the curved-surface television wall mount further includes two supports disposed on the wall panel, and the backs of the two television mounting plates are respectively connected by hinges to the two supports.

The wall panel is horizontally disposed, the supports are vertically disposed, the upper ends of the supports are provided with hanging hooks for hanging on the wall panel, and the lower ends of the supports are provided with bolts for fixing the supports to the wall panel. With this structure, when the supports are mounted, the supports are hung on the wall panel, and then, the bolts are tightened up to abut against the lower end of the wall panel to fix the supports.

Front sides of the television mounting plates are further provided with multiple mounting holes for mounting the television. The curved-surface television is mounted onto the television mounting plates by means of the mounting holes.

By using the aforementioned structure, the present disclosure has the following advantages: In the present disclosure, the television mounting plates are respectively connected by hinges to the supports, and the supports are mounted on the wall panel, so that the television mounting plates can rotate relative to the wall panel. When a curved-surface television is mounted, the front sides of the television mounting plates can fit to the back of the curved-surface television, and therefore, the curved-surface television can be mounted onto the television mounting plates by fasteners. In addition, because the television mounting plates can fit to the back of the curved-surface television, when the fasteners are tightened up, deviation, instability or looseness would not occur, so that the curved-surface television can be successfully mounted.

Figure 1:
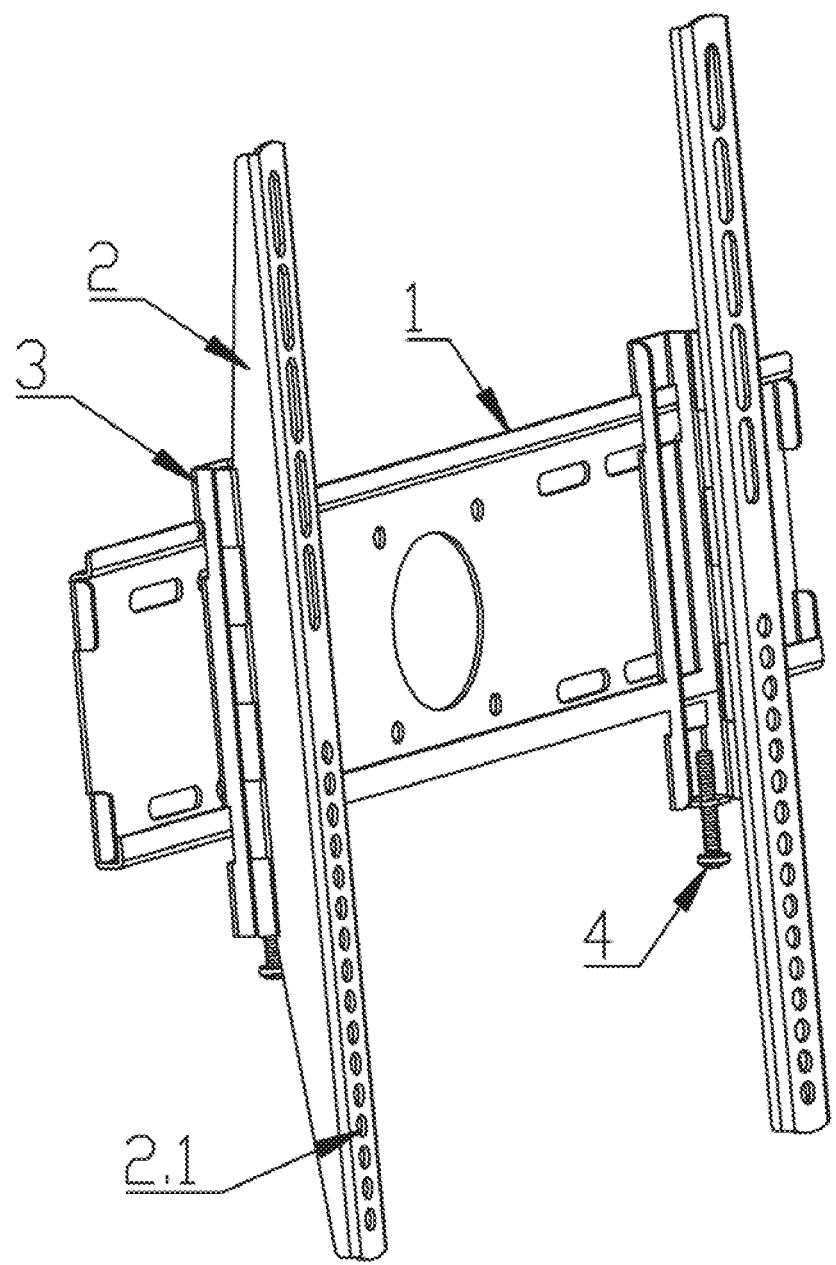
FIG. 1 is a schematic structural diagram of the present disclosure.
Figure 2:
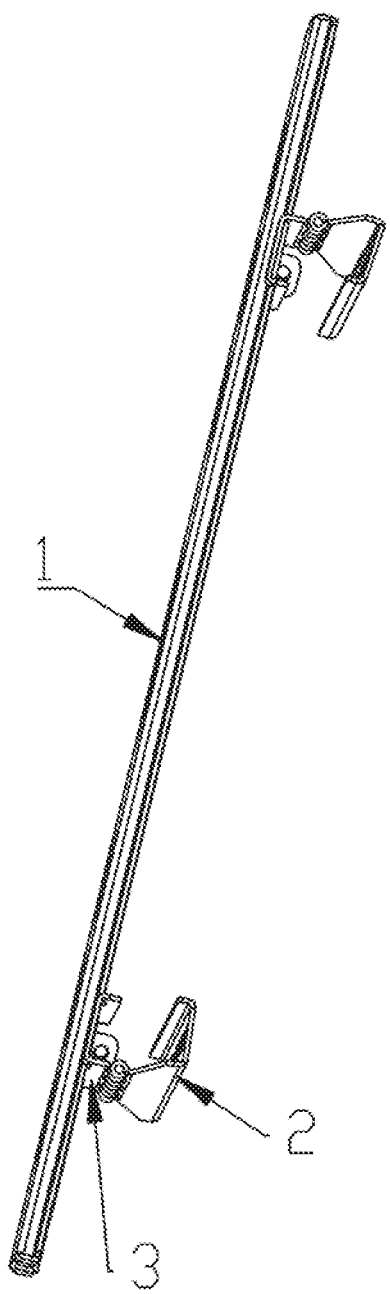
FIG. 2 is another schematic structural diagram of the present disclosure.

As shown in the drawings: 1. wall panel; 2. television mounting plate; 2.1. mounting hole; 3. Support; 4. bolt.

DETAILED DESCRIPTION

The present disclosure is further described below in detail with reference to the accompanying drawings and specific embodiments.

The present disclosure provides a curved-surface television wall mount, including a wall panel 1 for mounting on a wall surface, and two television mounting plates 2 disposed on the wall panel 1 for mounting a television. The curved-surface television wall mount further includes two supports 3 disposed on the wall panel 1, and the backs of the two television mounting plates 2 are respectively connected by hinges to the two supports. The front side of the television mounting plates 2 are long and narrow flat plates, the flat plates are provided with multiple mounting holes 2.1, and their backs are connected by hinges to the supports 3 The television mounting plates 2 may alternatively be connected by hinges to the supports 3 by other methods. However, the above all fall within the protection scope of the present application.

In this embodiment, the wall panel 1 is horizontally disposed on the wall surface, the two supports 3 are both hung on the wall panel 1 by hooks on the upper ends of the supports 3, and the distance between the two supports 3 can be adjusted to adapt to curved-surface televisions of different sizes. The television mounting plates 2 may correspond to vertically disposed long and narrow plates, and when the television mounting plates 2 are connected by hinges to the supports 3, hinge pins are vertically disposed, so that the television mounting plates 2 can rotate horizontally. After the two television mounting plates 2 are rotated inward to form a particular angle, the two television mounting plates 2 can fit to the back side of a curved-surface television. The angle of rotation may be set according to the curvature of the curved-surface television.

Since the television mounting plates 2 are connected by hinges to the supports 3, each of the two television mounting plates 2 can rotate. Therefore, when a curved-surface television with an arc-shaped back side is mounted, the television mounting plates 2 may be rotated inward to enable the front sides of the television mounting plates 2 to fit to the back side of the curved-surface television. Thus, the curved-surface television can be mounted by fasteners.

The wall panel 1 is horizontally disposed, the supports 3 are vertically disposed, the upper ends of the supports 3 are provided with hooks for hanging on the wall panel 1, and the lower ends of the supports 3 are provided with bolts 4 for fixing the supports 3 to the wall panel 1. With this structure, when the supports are mounted, the supports are hung on the wall panel, and then, the bolts are tightened up to abut against the lower end of the wall panel to fix the supports.

The front sides of the television mounting plates 2 are further provided with multiple mounting holes 2.1 for mounting the television. The mounting holes 2.1 include circular holes and slot holes. The curved-surface television is mounted onto the television mounting plates 2 by means of the mounting holes.

What is claimed is:
1. A curved-surface television wall mount, comprising:
a horizontally disposed wall panel for mounting on a wall surface;

a first support directly connected to the horizontally disposed wall panel, the first support being a unitary piece;

a second support directly connected to the horizontally disposed wall panel, the second support being a unitary piece;

a first vertically disposed television mounting plate directly connected to the first support by a first hinge, the first hinge including a first vertically disposed hinge pin that enables the first vertically disposed television mounting plate to rotate horizontally; and a second vertically disposed television mounting plate connected to the second support by a second hinge, the second hinge including a second vertically disposed hinge pin that enables the second vertically disposed television mounting plate to rotate horizontally;

wherein the first vertically disposed television mounting plate and the second vertically disposed television mounting plate are each rotatable horizontally towards one another to form a respective angle that accommodates a curvature of a back side of a curved-surface television;

wherein upper ends of both the first support and the second support are provided with hooks for hanging on the horizontally disposed wall panel, and lower ends of both the first support and the second support are provided with bolts for fixing the first support and the second support to the horizontally disposed wall panel;

wherein the first vertically disposed television mounting plate and the second vertically disposed television mounting plate each include a front side, the front side being dimensioned to have a height that is greater than (i) its width, and (ii) a vertical width of the horizontally disposed wall panel; and wherein the first support and the second support each have a vertical length that is greater than the vertical width of the horizontally disposed wall panel.

2. The curved-surface television wall mount according to claim 1, wherein both the first vertically disposed television mounting plate and the second vertically disposed television mounting plate each have a back side.

3. The curved-surface television wall mount according to claim 2, wherein both the front side of the first vertically disposed television mounting plate and the front side of the second vertically disposed television mounting plate each further include multiple mounting holes.

4. The curved-surface television wall mount according to claim 3, wherein the multiple mounting holes includes circular holes.

5. The curved-surface television wall mount according to claim 3, wherein the multiple mounting holes includes slots.

6. The curved-surface television wall mount according to claim 2, wherein the front side of the first vertically disposed television mounting plate is coupled to a first fastener, and the front side of the second vertically disposed television mounting plate is coupled to a second fastener.

7. The curved-surface television wall mount according to claim 6, wherein the back side of the curved-surface television is mounted to the first vertically disposed television mounting plate by the first fastener of the first vertically disposed television mounting plate and to the second vertically disposed television mounting plate by the second fastener of the second vertically disposed television mounting plate.

8. The curved-surface television wall mount according to claim 1, wherein the first vertically disposed television mounting plate and the second vertically disposed television mounting plate are each mounted to a back side of the curved-surface television.

9. The curved-surface television wall mount according to claim 1, wherein the height of the first vertically disposed television mounting plate is greater than the vertical length of the first support.

10. The curved-surface television wall mount according to claim 9, wherein the height of the second vertically disposed television mounting plate is greater than the vertical length of the second support.

11. The curved-surface television wall mount according to claim 1, wherein an upper portion of the horizontally disposed wall panel includes a protruding lip, and wherein at least the hooks of the upper end of the first support hangs on the protruding lip of the upper portion of the horizontally disposed wall panel.

12. The curved-surface television wall mount according to claim 11, wherein the protruding lip of the upper portion of the horizontally disposed wall panel extends from a first end of the horizontally disposed wall panel to a second end of the horizontally disposed wall panel.

13. The curved-surface television wall mount according to claim 11, wherein a lower portion of the horizontally disposed wall panel includes a protruding lip.

14. The curved-surface television wall mount according to claim 13, wherein the protruding lip of the lower portion of the horizontally disposed wall panel extends from a first end of the horizontally disposed wall panel to a second end of the horizontally disposed wall panel.

\* \* \* \* \*